United States Patent
Kim et al.

(10) Patent No.: US 10,827,120 B1
(45) Date of Patent: Nov. 3, 2020

(54) OPTICAL IMAGE STABILIZATION DEVICE AND COMMUNICATION METHOD THEREOF WITH ENHANCED SERIAL PERIPHERAL INTERFACE COMMUNICATION EFFICIENCY

(71) Applicant: Samsung Electro-Mechanics Co., Ltd., Suwon-si (KR)

(72) Inventors: Gyu Won Kim, Suwon-si (KR); Kyoung Joong Min, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/682,219

(22) Filed: Nov. 13, 2019

(30) Foreign Application Priority Data

Apr. 19, 2019 (KR) .................. KR10-2019-0046210

(51) Int. Cl.
*H04N 5/232* (2006.01)
*G06F 13/42* (2006.01)
*G06F 11/10* (2006.01)

(52) U.S. Cl.
CPC ..... *H04N 5/23258* (2013.01); *G06F 11/1004* (2013.01); *G06F 13/4282* (2013.01)

(58) Field of Classification Search
CPC . H04N 5/23248–2329; H04N 5/23258; G02B 27/646; G03B 2217/005; G03B 2205/0007–0038; G06T 7/38; G06F 13/4282; G06F 11/1004
USPC ............... 348/208.14, 208.99; 359/554–557; 396/52–55, 13
See application file for complete search history.

(56) References Cited

U.S. PATENT DOCUMENTS

| | | | | |
|---|---|---|---|---|
| 2008/0152332 | A1* | 6/2008 | Koo ................... | H04N 5/23287 396/55 |
| 2017/0364303 | A1* | 12/2017 | Shih ...................... | G06F 3/0673 |

FOREIGN PATENT DOCUMENTS

KR 2003-0024250 A 3/2003

* cited by examiner

*Primary Examiner* — Yogesh K Aggarwal
(74) *Attorney, Agent, or Firm* — NSIP Law

(57) ABSTRACT

A camera apparatus includes an optical image stabilizer (OIS) device including a control circuit controlling data processing including reading data and writing data, and a digital circuit including a serial peripheral interface bus (SPI) master performing data processing based on SPI communications performed using the SPI master under control of the control circuit to perform an OIS function; and a sensor device including an SPI slave communicating with the SPI master and responding to a request from the OIS device. The control circuit sets a selected SPI communications mode selected from a plurality of predefined SPI communications modes. The digital circuit performs the selected SPI communications mode, and in response to the selected SPI communications mode being a burst status mode with a status check, checks two or more status bits for corresponding data to be read from the sensor device before reading the corresponding data from the sensor device.

16 Claims, 15 Drawing Sheets

OPTICAL IMAGE STABILIZATION DEVICE AND COMMUNICATION METHOD THEREOF WITH ENHANCED SERIAL PERIPHERAL INTERFACE COMMUNICATION EFFICIENCY

CROSS-REFERENCE TO RELATED APPLICATIONS

This application claims the benefit under 35 U.S.C. 119(a) of Korean Patent Application No. 10-2019-0046210 filed on Apr. 19, 2019, in the Korean Intellectual Property Office, the entire disclosure of which is incorporated herein by reference for all purposes.

BACKGROUND

1. Field

This application relates to an optical image stabilization (OIS) device for a camera apparatus having enhanced serial peripheral interface (SPI) communication efficiency and a communication method thereof.

2. Description of Related Art

Optical image stabilizer (OIS) technology, a technology for preventing a captured image from disadvantageously shaking due to user hand-shake during image capturing with a handheld camera, has been applied to some camera modules.

OIS systems need data of a sensor device, such as a gyro sensor or an acceleration sensor, for more stable operation.

Conventional OIS systems read data from a navigation sensor, such as a gyro sensor or an acceleration sensor, using a serial peripheral interface (SPI) bus or an inter-integrated circuit (I2C) bus.

Typically, a conventional OIS system is operatively associated with a microcontroller unit (MCU) to read data from a sensor device, such as a gyro sensor or an acceleration sensor. In order for the MCU to read data from the sensor device, the MCU needs to access a digital circuit. The number of times the MCU accesses the digital circuit has an effect on a speed of reading data from the sensor device and an MCU internal processing speed.

In a conventional OIS system, to read two different types of data from a gyro sensor, the MCU sequentially transmits a command to the digital circuit via SRI communications to check a status of the gyro sensor, reads one type of data from the gyro sensor, retransmits a command to the digital circuit via SRI communications to check a status of the gyro sensor, and reads the other type of data from the gyro sensor.

In the method described above, in the conventional OIS device, an SRI master of the digital circuit receives two commands from the MCU to read two types of data. Therefore, it takes a relatively long time to read the two types of data, which reduces a data processing speed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera apparatus includes an optical image stabilizer (OIS) device including a control circuit configured to control data processing including reading data and writing data, and a digital circuit including a serial peripheral interface bus (SRI) master and configured to perform data processing based on SRI communications performed using the SRI master in response to the control of the control circuit to perform an OIS function; and a sensor device including an SRI slave configured to communicate with the SRI master and respond to a request from the OIS device, wherein the control circuit is further configured to set a selected SRI communications mode selected from a plurality of predefined SRI communications modes including a single mode, a plurality of burst modes without a status check, and a plurality of burst status modes with a status check, and control communications between the digital circuit and the sensor device using the selected SRI communications mode, and the digital circuit is further configured to perform the selected SRI communications mode in response to the control of the control circuit, and in response to the selected SRI communications mode being one of the plurality of burst status modes with a status check, check two or more status bits for corresponding data to be read from the sensor device before reading the corresponding data from the sensor device.

One of the plurality of burst modes with a status check may be a specific communications mode in which a status is checked for each corresponding data to be read, and the digital circuit may be further configured to check a status for each corresponding data to be read from the sensor device and read the corresponding data from the sensor device using a preset status check frame and a preset data frame in response to the selected SRI communications mode being the specific communications mode.

The digital circuit may include a first memory including a mask pattern register having two or more check bits enabled, the two or more check bits corresponding to the two or more status bits, the sensor device may include a second memory configured to store the corresponding data, and the digital circuit may be further configured to read the corresponding data from the second memory.

The digital circuit may be further configured to check the two or more status bits for the corresponding data to be read from the sensor device using the two or more check bits enabled in the mask pattern register to determine whether the corresponding data to be read from the sensor device is updated valid data, and read the corresponding data from the second memory in response to the corresponding data being determined to be updated valid data.

The digital circuit may be further configured to perform the single mode using one data frame in response to the selected SRI communications mode being the single mode, and perform a corresponding burst mode using one or two data frames in response to the selected SRI communications mode being one of a first burst mode without a status check, a second burst mode without a status check, a first burst status mode with a status check, a second burst status mode with a status check, and a third burst status mode with a status check.

The single mode may be a mode in which the corresponding data to be read from the sensor device is processed using one data frame, the first burst mode may be a mode in which the corresponding data to be read from the sensor device is processed using one data frame without a status check, the second burst mode may be a mode in which the corresponding data to be read from the sensor device is processed using two data frames without a status check, the first burst status mode may be a mode in which the corresponding data to be read from the sensor device is processed using one status check frame and one data frame, the second burst status mode may be a mode in which the corresponding data to be read from the sensor device is processed using one status check frame and two data frames, and the third burst status mode may be a mode in which the corresponding data to be read from the sensor device is processed using a first status check frame, a first data frame, a second status check frame, and a second data frame.

The digital circuit may be further configured to read and store the corresponding data from the sensor device using one data frame in the single mode in response to the selected SRI communications mode being the single mode, read and store the corresponding data from the sensor device using one data frame without a status check in the first burst mode in response to the selected SRI communications mode being the first burst mode, read and store the corresponding data from the sensor device using two data frames without a status check in the second burst mode in response to the selected SRI communications mode being the second burst mode, read and store the corresponding data from the sensor device using one status check frame and one data frame in the first burst status mode in response to the selected SRI communications mode being the first burst status mode, read and store the corresponding data from the sensor device using one status check frame and two data frames in the second burst status mode in response to the selected SRI communications mode being the second burst status mode, and read and store the corresponding data from the sensor device using a first status check frame, a first data frame, a second status check frame, and a second data frame in the third burst status mode in response to the selected SRI communications mode being the third burst status mode.

The status check frame of each of the first burst status mode and the second burst status mode and each of the status check frames of the third burst mode may include a read identification region, an address region, and a data region, the data frame of the single mode may include a read identification region, an address region, and a data region for reading gyro data or acceleration data from the sensor device, and the data frame of each of the first burst mode and the first burst status mode and each of the data frames of the second burst mode, the second burst status mode, and the third burst status mode may include a read identification region, an address region, and a plurality of data regions for reading gyro data or acceleration data from the sensor device.

In another general aspect, a communication method of a camera apparatus including an optical image stabilizer (OIS) device, the OIS device including a digital circuit and a sensor device, the digital circuit including a serial peripheral interface bus (SPI) master and a control circuit, the sensor device including an SPI configured to perform SPI communication with the SPI master, includes setting a selected SPI communications mode selected from a plurality of predefined SPI communications modes including a single mode, a plurality of burst modes without a status check, and a plurality of burst modes with a status check; processing corresponding data from the sensor device by performing the selected SPI communications mode, the processing of the corresponding data including, in response to the selected SPI communications mode being one of the plurality of burst modes with a status check, checking two or more status bits for corresponding data to be read from the sensor device before reading the corresponding data from the sensor device; and storing the corresponding data read from the sensor device.

One of the plurality of burst modes with a status check may be a specific communications mode in which a status is checked for each corresponding data to be read, and the processing of the corresponding data may further include checking a status for each corresponding data to be read from the sensor device and reading the corresponding data from the sensor device using a preset status check frame and a preset data frame in response to the selected SPI communications mode being the specific communications mode.

The digital circuit may include a first memory including a mask pattern register having two or more check bits enabled, the two or more check bits corresponding to the two or more status bits, the sensor device may include a second memory configured to store the corresponding data, and the processing of the corresponding data may further include reading the corresponding data from the second memory.

The processing of the corresponding data may further include checking the two or more status bits for the corresponding data to be read from the sensor device using the two or more check bits enabled in the mask pattern register to determine whether the corresponding data to be read from the sensor device is updated valid data, and reading the corresponding data from the second memory in response to the corresponding data being determined to be updated valid data.

The processing of the corresponding data further may include performing the single mode using one data frame in response to the selected SRI communications mode being the single mode, and performing a corresponding burst mode using one or two data frames in response to the selected SRI communications mode being one of a first burst mode without a status check, a second burst mode without a status check, a first burst status mode with a status check, a second burst status mode with a status check, and a third burst status mode with a status check.

The single mode may be a mode in which the corresponding data to be read from the sensor device is processed using one data frame, the first burst mode may be a mode in which the corresponding data to be read from the sensor device is processed using one data frame without a status check, the second burst mode may be a mode in which the corresponding data to be read from the sensor device is processed using two data frames without a status check, the first burst status mode may be a mode in which the corresponding data to be read from the sensor device is processed using one status check frame and one data frame, the second burst status mode may be a mode in which the corresponding data to be read from the sensor device is processed using one status check frame and two data frames, and the third burst status mode may be a mode in which the corresponding data to be read from the sensor device is processed using a first status check frame, a first data frame, a second status check frame, and a second data frame.

The processing of the corresponding data may further include reading and storing the corresponding data from the sensor device using one data frame in the single mode in response to the selected SRI communications mode being the single mode, reading and storing corresponding data from the sensor device using one data frame without a status check in the first burst mode in response to the selected SRI communications mode being the first burst mode, reading and storing corresponding data from the sensor device using two data frames without a status check in the second burst mode in response to the selected SRI communications mode being the second burst mode, reading and storing corresponding data from the sensor device using one status check frame and one data frame in the first burst status mode in response to the selected SRI communications mode being the first burst status mode, reading and storing corresponding data from the sensor device using one status check frame and two data frames in the second burst status mode in response to the selected SRI communications mode being the second burst status mode, and reading and storing corresponding data from the sensor device using a first status check frame, a first data frame, a second status check frame, and a second data frame in the third burst status mode in response to the selected SPI communications mode being the third burst status mode.

The status check frame of each of the first burst status mode and the second burst status mode and each of the status check frames of the third burst status mode may include a read identification region, an address region, and a data region, the data frame of the single mode may include a read identification region, an address region, and a data region for reading gyro data or acceleration data from the sensor device, and the data frame of each of the first burst mode and the first burst status mode and each of the data frames of the second burst mode, the second burst status mode, and the third burst status mode may include a read identification region, an address region, and a plurality of data regions for reading gyro data or acceleration data from the sensor device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
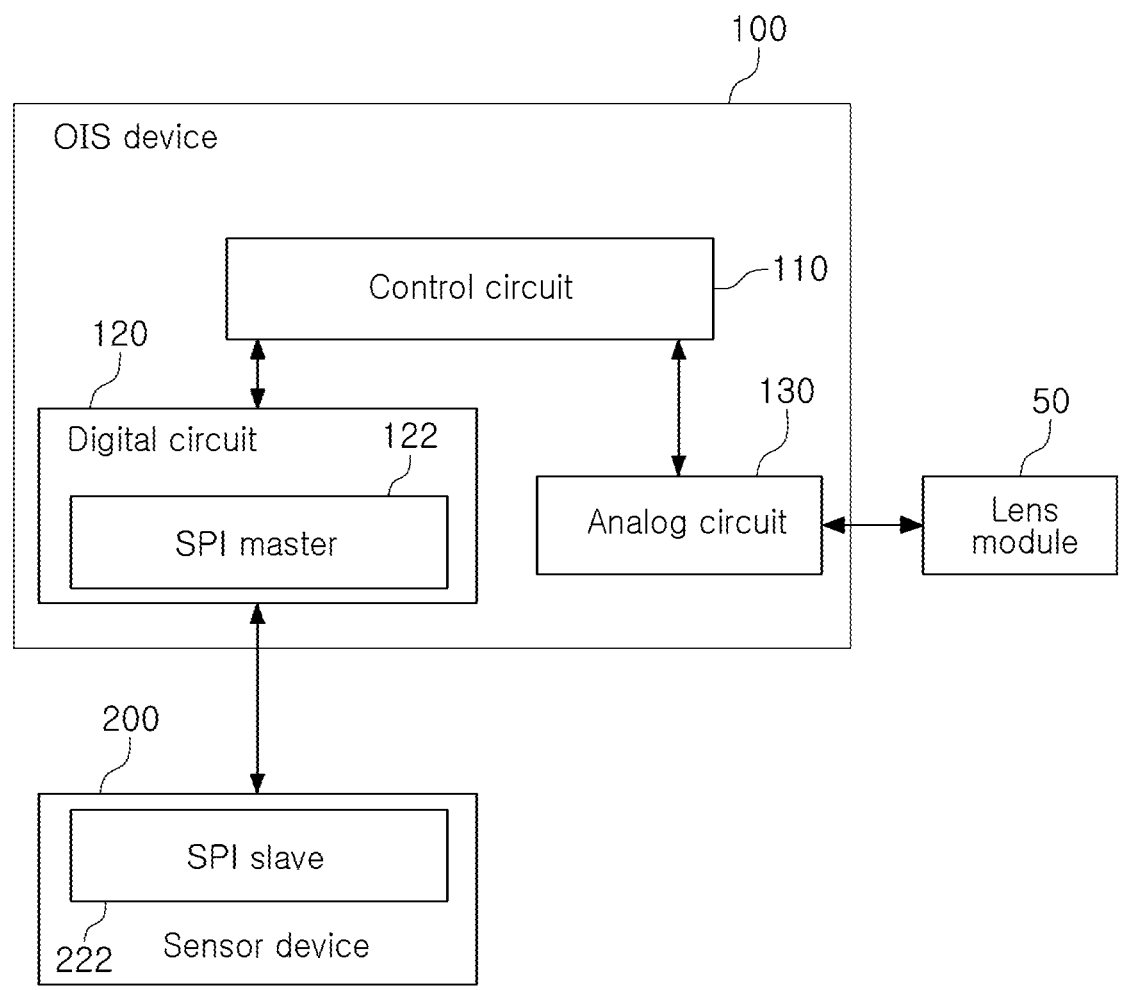
FIG. 1 is a block diagram of an example of a camera apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The features of the examples described herein may be combined in various ways as will be apparent after an understanding of the disclosure of this application. Further, although the examples described herein have a variety of configurations, other configurations are possible, as will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is a block diagram of an example of a camera apparatus.

Referring to FIG. 1, the camera apparatus includes a lens module 50, an optical image stabilizer (OIS) device 100, and a sensor device 200.

The OIS circuit 100 includes a control circuit 110, a digital circuit 120, and an analog circuit 130.

The control circuit 110 controls data processing including data reading and data writing to perform an optical image stabilization (OIS) function.

The digital circuit 120 includes a serial peripheral interface bus (SPI) master 122 to perform data processing, such as data reading and data writing, of corresponding data using SPI communications with the sensor device 200 in response to control of the control circuit 110.

The analog circuit drives the lens module 50 in response to control of the control circuit 110, detects a driving state of the lens module 50, and provides a detection signal to the control circuit 110.

The sensor device 200 includes an SPI slave 222 to communicate with the SPI master 122 in response to a request from the OIS device 100. As an example, the sensor device 200 performs communications with the SPI master 122 of the digital circuit 120 using the SPI slave 222 and provides corresponding data in response to a request from the OIS device 100. For example, the corresponding data provided by the sensor device 200 may be angular velocity data from a gyro sensor or acceleration data from an acceleration sensor.

As an example, the sensor device 200 includes either one or both of a gyro sensor configured to measure angular velocity and an acceleration sensor configured to measure acceleration.

The control circuit 110 sets a selected SPI communications mode selected from a plurality of predefined SPI communications modes including a single mode based, for example, on a type of the SPI slave 222, a type of corresponding data to be written into the sensor device 200 or read from the sensor device 200, and a location in the sensor device 200 where the corresponding data is to be written or read, a plurality of burst modes without a status check, and a plurality of burst modes with a status check, and controls communications between the digital circuit 120 and the sensor device 200 using the selected SPI communications mode.

The single mode is a mode for reading or writing a single byte of data, and each of the burst modes is a mode for reading two or more bytes of data.

For example, when an event occurs, such as writing corresponding data into the sensor device 200 or reading corresponding data from the sensor device 200, the control circuit 110 performs an SPI communications setting operation to set a selected SPI communications mode selected from a plurality of predefined SPI communications modes including a single mode SM, a first burst BM1 without a status check, a second burst mode BM2 without a status check, a first burst status mode BSM1 with a status check, a second burst status mode BSM2 with a status check, and a third burst status mode BSM3 with a status check, controls communications between the digital circuit 120 and the sensor device 200 using the selected SPI communications mode to write the corresponding data into the sensor device 200 or read the corresponding data from the sensor device 200, and processes the corresponding data provided by the sensor device 200.

Then, the control circuit 110 controls the lens module 50 using the analog circuit 130 based on the communications between the digital circuit 120 and the sensor device 200 performed using the selected SPI communications mode.

As an example, the control circuit 110 provides a control signal for control of the lens module 50 to the analog circuit 130 based on data from the digital circuit 120 and data from the analog circuit 130.

The digital circuit 120 performs the selected SRI communications mode in response to control of the control circuit 110. When the selected SRI communications mode is one of the plurality of burst modes with a status check, the digital circuit 120 checks two or more status bits for corresponding data to determine whether there is an error in the corresponding data before reading the corresponding data.

As an example, the digital circuit 120 reads corresponding data from the sensor device 200 and provides the corresponding data to the control circuit 110 using the selected SRI communications mode in response to control of the control circuit 110.

In the following description, repeated descriptions of components in the drawings that have already been described will be omitted, and only differences between the drawings will be described.

Figure 2:
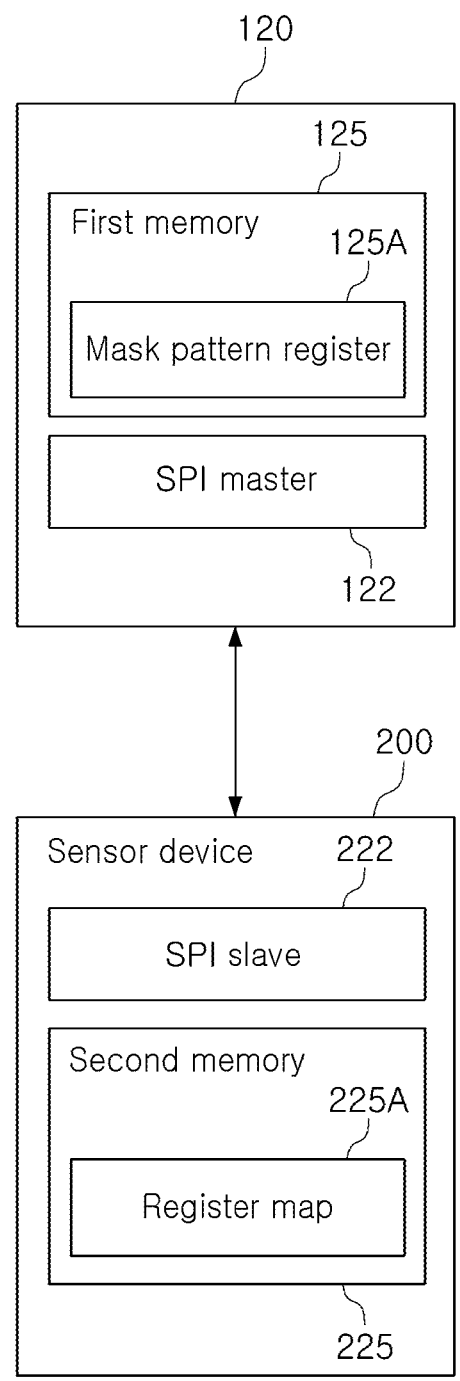
FIG. 2 is a block diagram of an example of a digital circuit and a sensor device of the camera apparatus in FIG. 1.

FIG. 2 is a block diagram of an example of a digital circuit and a sensor device of the camera apparatus in FIG. 1.

Referring to FIG. 2, the digital circuit 120 includes a first memory 125. The first memory 125 includes a mask pattern register 125A having two or more check bits enabled. For example, the mask pattern register 125A is an 8-bit mask pattern register. In this case, among the 8 bits, two or more check bits are enabled to select two or more status bits for corresponding data to be processed. The mask pattern register 125A having two or more check bits enabled is used to enhance a precision of data processing.

The sensor device 200 includes a second memory 225. The second memory 225 includes a register map 225A for reading or writing corresponding data.

Referring to FIGS. 1 and 2, one of the plurality of burst modes with a status check is a specific communications mode in which a status is checked for each data to be read.

The digital circuit 120 checks a status of each corresponding data of the sensor device 200 to read the corresponding data using a preset status check frame and a preset data frame when performing the specific communications mode. In this case, the specific communications mode is a third burst status mode BSM3 that will be described below.

The digital circuit 120 checks two or more status bits in a status register in the register map 225A for corresponding data to be read from a data register in the register map 225A according to the two or more check bits enabled in the mask pattern register 125A to more precisely determine whether the corresponding data is updated valid data.

As an example, the digital circuit 120 performs a single mode SM using one data frame when the single mode SM is the selected SPI communications mode. As another example, the digital circuit 120 performs a selected burst mode using one or two data frames when the first burst mode BM1 or the second burst mode BM2 each without a status check is the selected SPI communications mode, or when the first burst status mode BSM1, the second burst status mode BSM2, or the third burst status mode BSM3 each with a status check is the selected SPI communications mode.

As an example, the single mode SM is a mode in which data is processed using one data frame. The first burst mode BM1 is a mode in which data is processed using one data frame without a status check. The second burst mode BM2 is a mode in which data is processed using two data frames without a status check. The first burst status mode BSM1 is a mode in which data is processed using a status check frame and one data frame. The second burst status mode BSM2 is a mode in which data is processed using a status check frame and two data frames. The third burst status mode BSM3 is a mode in which data is processed using a first status check frame, a first data frame, a second status check frame, and a second data frame.

For example, in the single mode SM, the digital circuit 120 reads and stores corresponding data from the sensor device 200 using one data frame.

In the first burst mode BM1, the digital circuit 120 reads and stores corresponding data from the sensor device 200 using one data frame without a status check.

In the second burst mode BM2, the digital circuit 120 reads and stores corresponding data from the sensor device 200 using two data frames without a status check.

In the first burst status mode BSM1, the digital circuit 120 reads and stores corresponding data from the sensor device 200 using a status check frame and one data frame.

In the second burst status mode BSM2, the digital circuit 120 reads and stores corresponding data from the sensor device 200 using a status check frame and two data frames.

In the third burst status mode BSM3, the digital circuit 120 reads and stores corresponding data from the sensor device 200 using a first status check frame, a first data frame, a second status check frame, and a second data frame.

Figure 3:
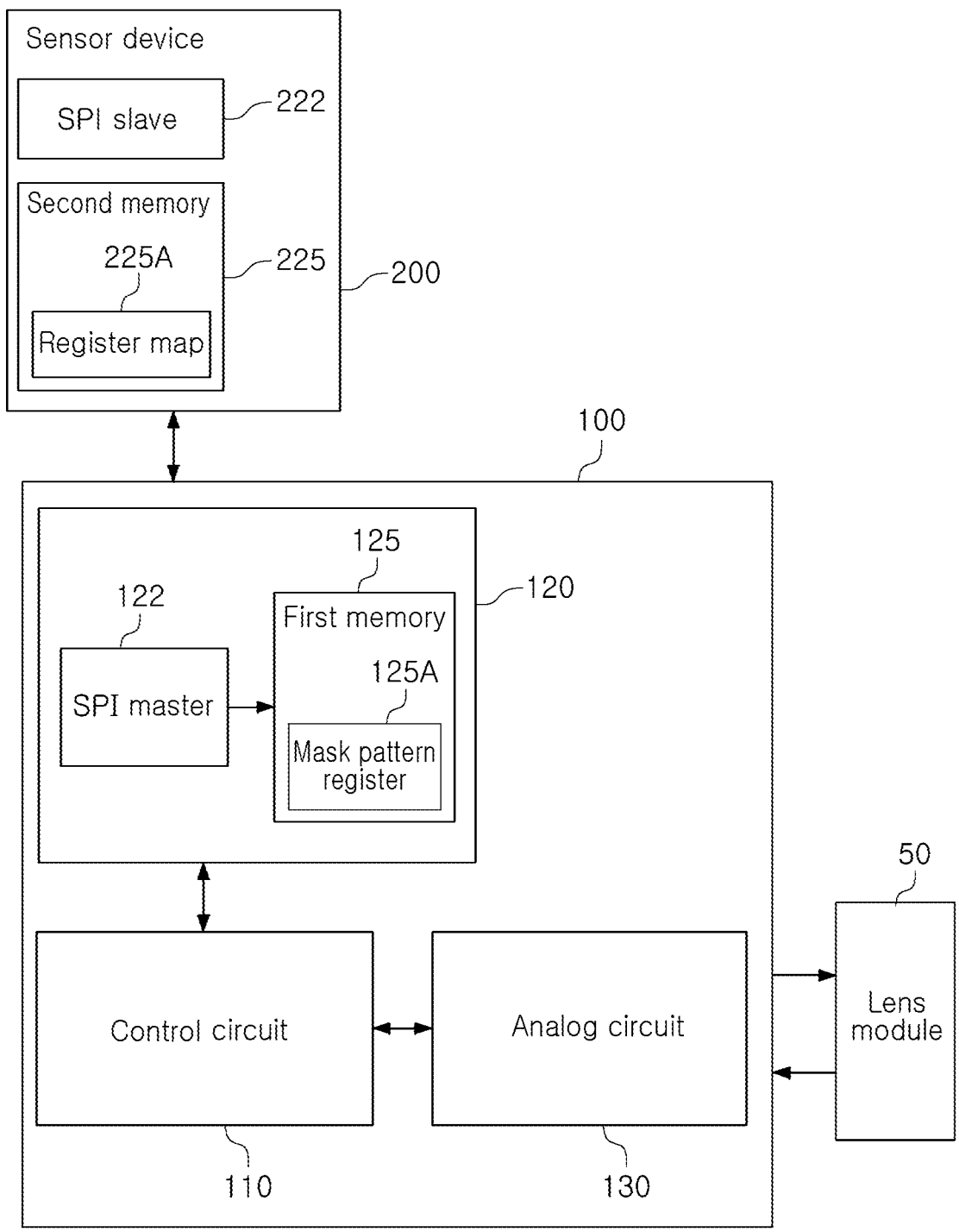
FIG. 3 is a block diagram of an example of an OIS device of the camera apparatus in FIG. 1.

FIG. 3 is a block diagram of an example of an OIS device of the camera apparatus in FIG. 1.

Referring to FIG. 3, as an example, the sensor device 200 includes a gyro sensor. As another example, the sensor device 200 includes a triaxial gyro sensor and a triaxial acceleration sensor.

The register map 225A writes data received from the digital circuit 120 in the data register in the register map 225A, or reads stored corresponding data from the data register in the register map 225A in response to a request from the digital circuit 120 to provide the corresponding data to the control circuit 110. As an example, the register map 225A includes a gyro status register and a gyro data register when the sensor device 200 includes a gyro sensor. As another example, the register map 225A includes a gyro status register, an acceleration status register, a gyro data register, and an acceleration data register when the sensor device 200 includes a triaxial gyro sensor and a triaxial acceleration sensor.

As an example, the control circuit 110 provides control data to the analog circuit 130 based on data from the digital circuit 120. The analog circuit 130 drives the lens module 50 based on the control data from the control circuit 110, detects a position of the lens module 50 depending on the driving of the lens module 50, and provides detection data to the control circuit 110 as a detection signal.

Referring to FIGS. 1 to 3, the description of the camera apparatus in FIG. 1 is also applicable to a communication method of the camera apparatus in FIG. 1 that will be described below.

First, the control circuit 110 of the OIS device 100 of the camera apparatus, illustrated in FIG. 1, performs an SRI communications setting in advance. The control circuit 110 of the OIS device 100 sets a selected SRI communications mode for processing corresponding data, and controls the digital circuit 120 to process data using the selected SRI communications mode.

Next, the digital circuit 120 performs communications with the sensor device 200 using the selected SRI communications mode in response to the control of the control circuit 110 to write corresponding data into the sensor device 200 or read corresponding data from the sensor device 200.

Figure 4:
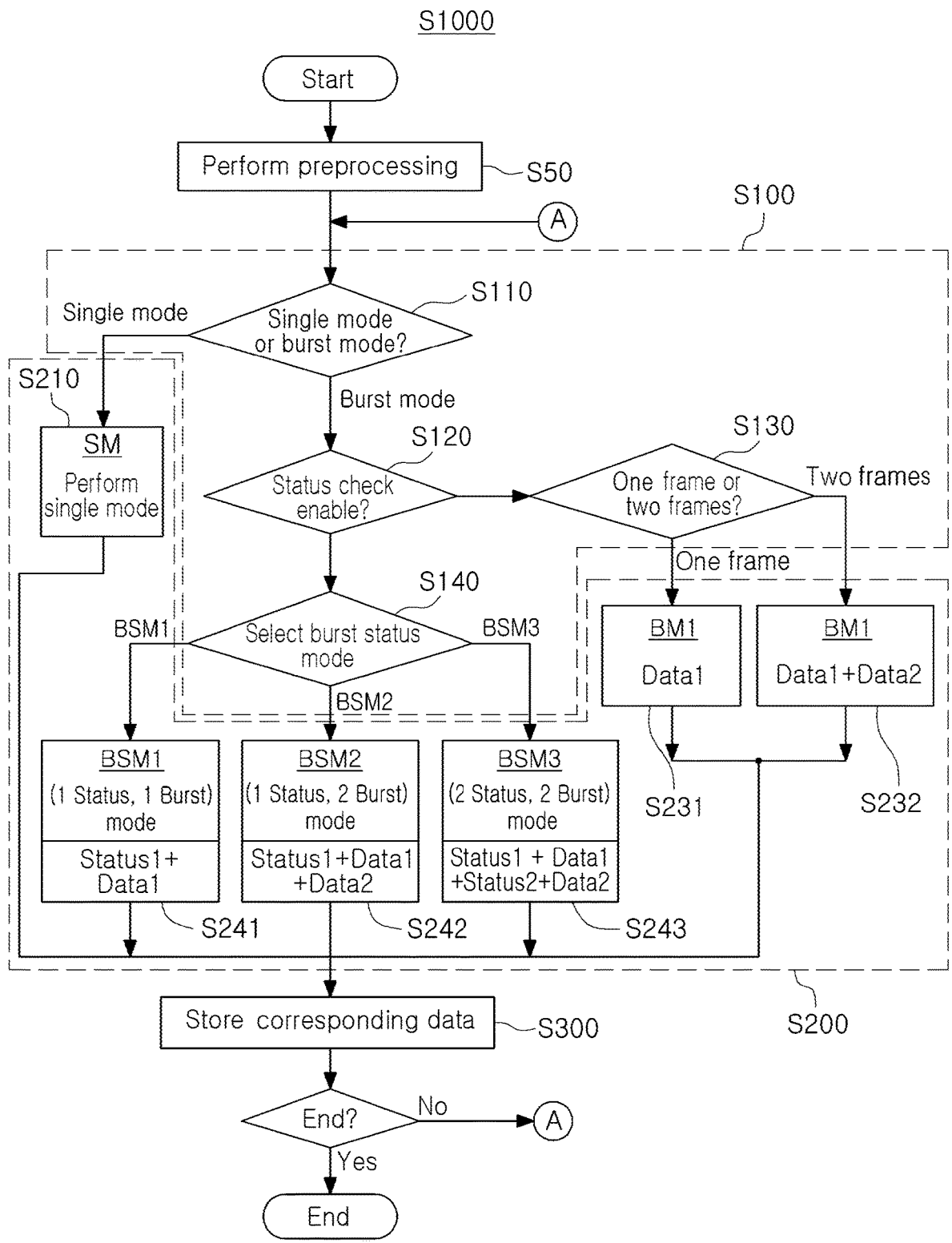
FIG. 4 is a flowchart illustrating an example of a communication method of the camera apparatus in FIG. 1.
Figure 5A:
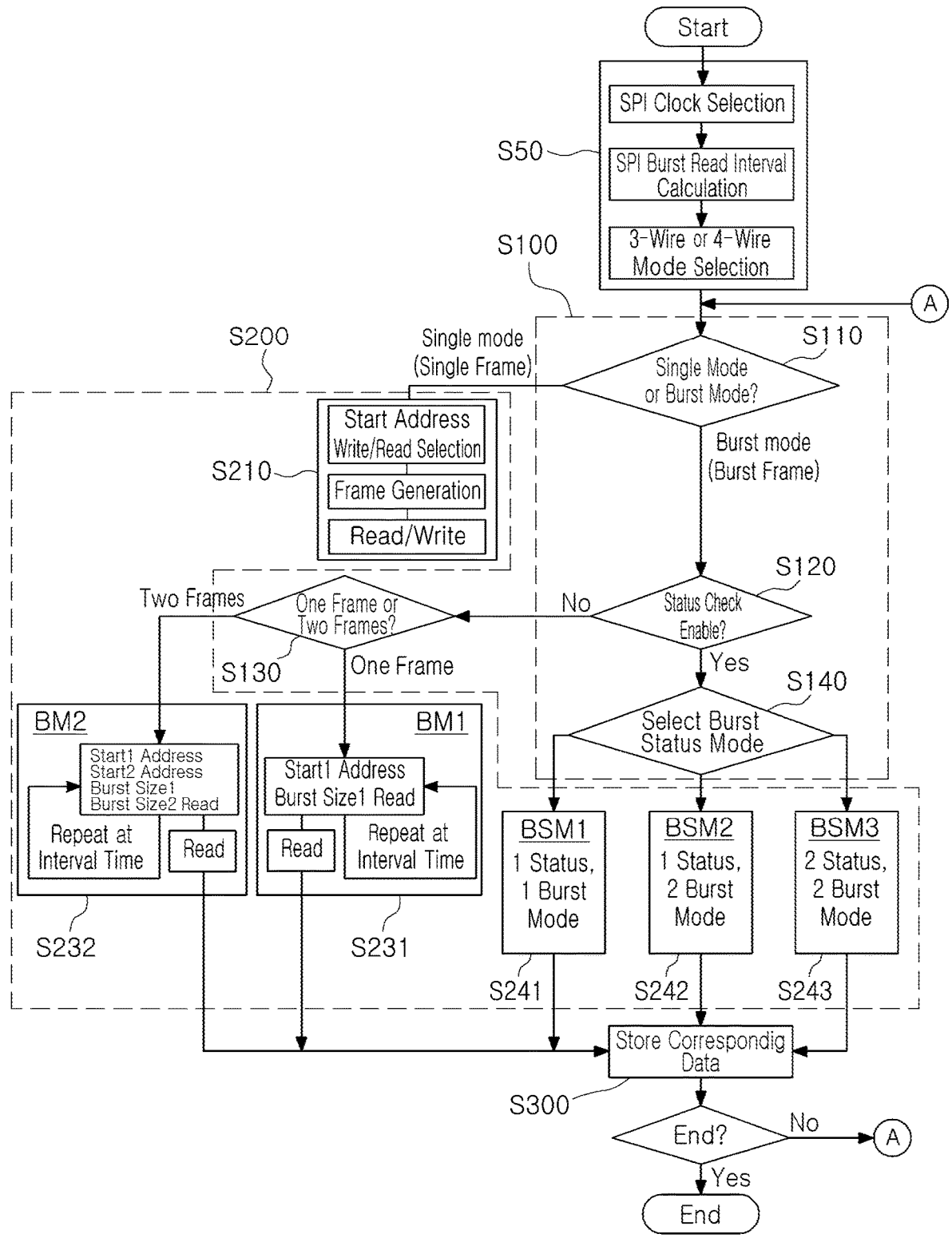
FIG. 5A is a flowchart illustrating a more detailed example of the communication method in FIG. 4 of the camera apparatus in FIG. 1.
Figure 5B:
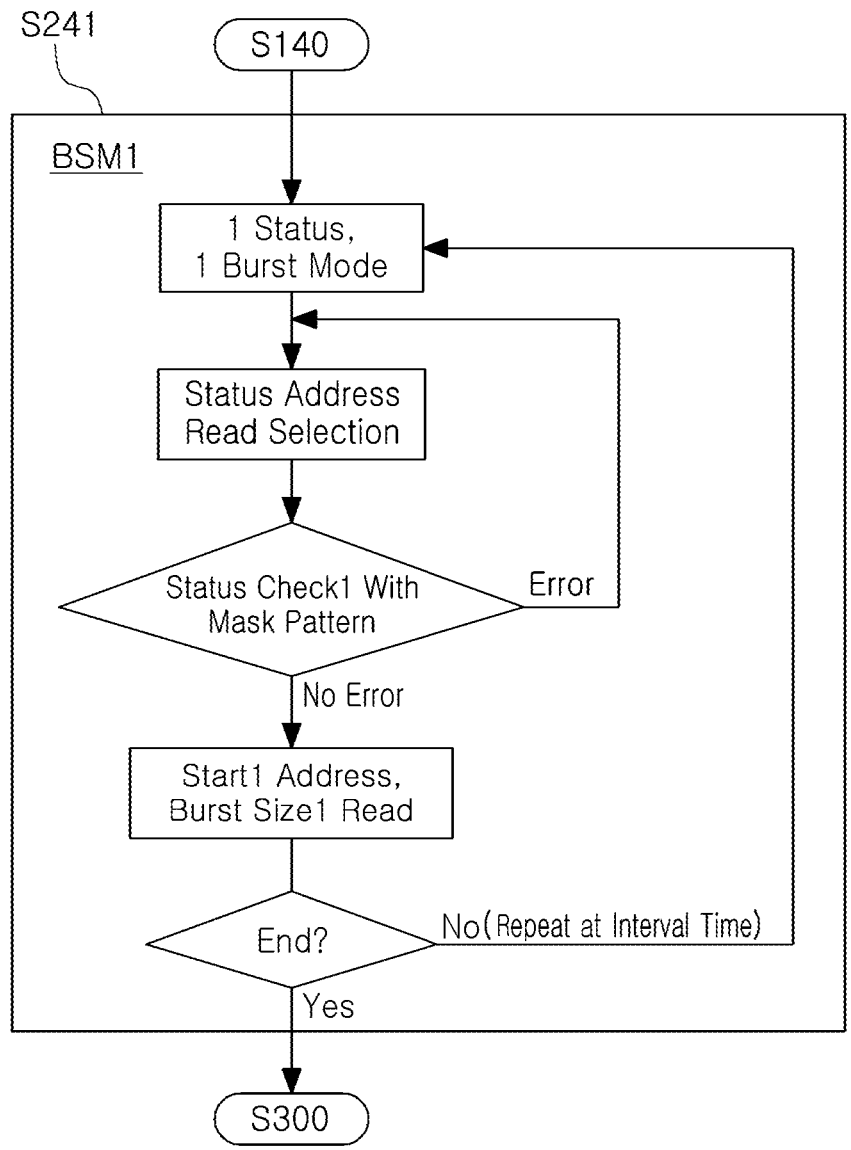
FIG. 5B is a flowchart illustrating an example of an operating flow in a first burst status mode BSM1 in FIGS. 4 and 5A.
Figure 5C:
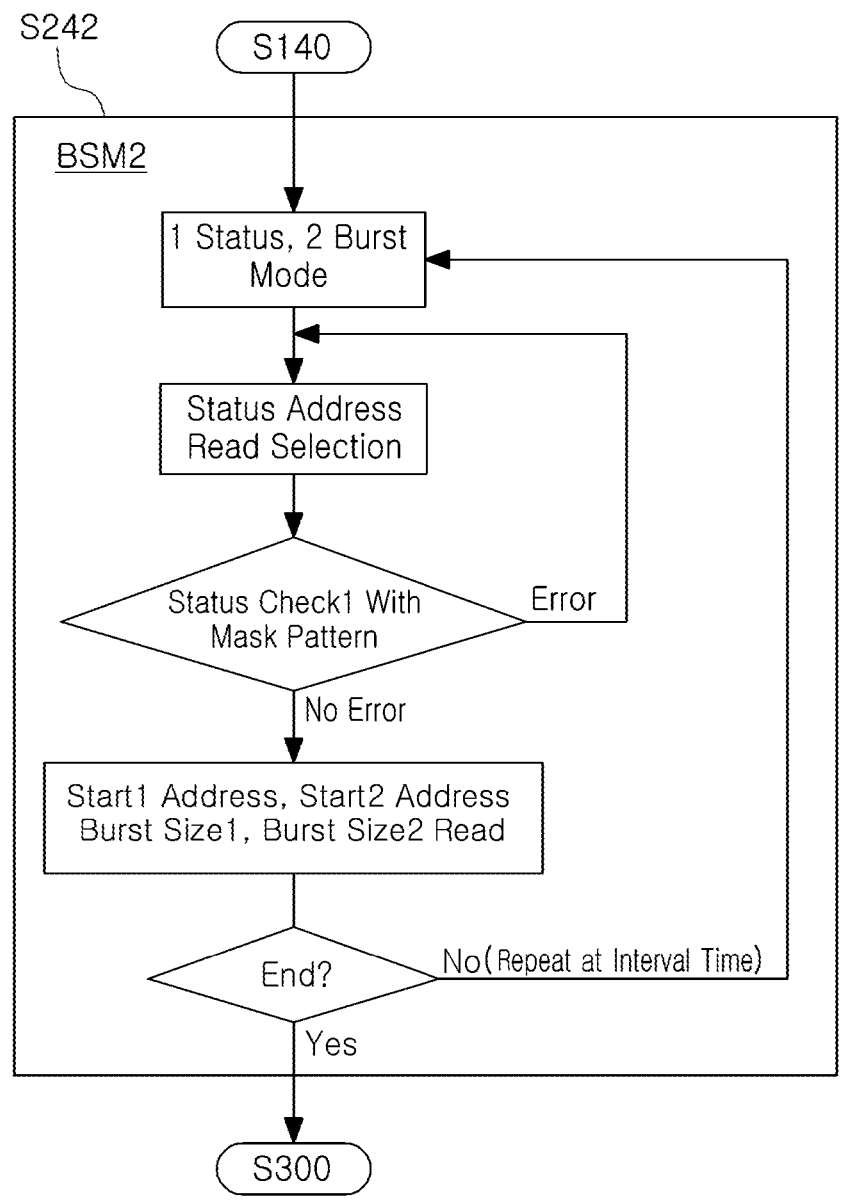
FIG. 5C is a flowchart illustrating an example of an operating flow in a second burst status mode BSM2 in FIGS. 4 and 5A.
Figure 5D:
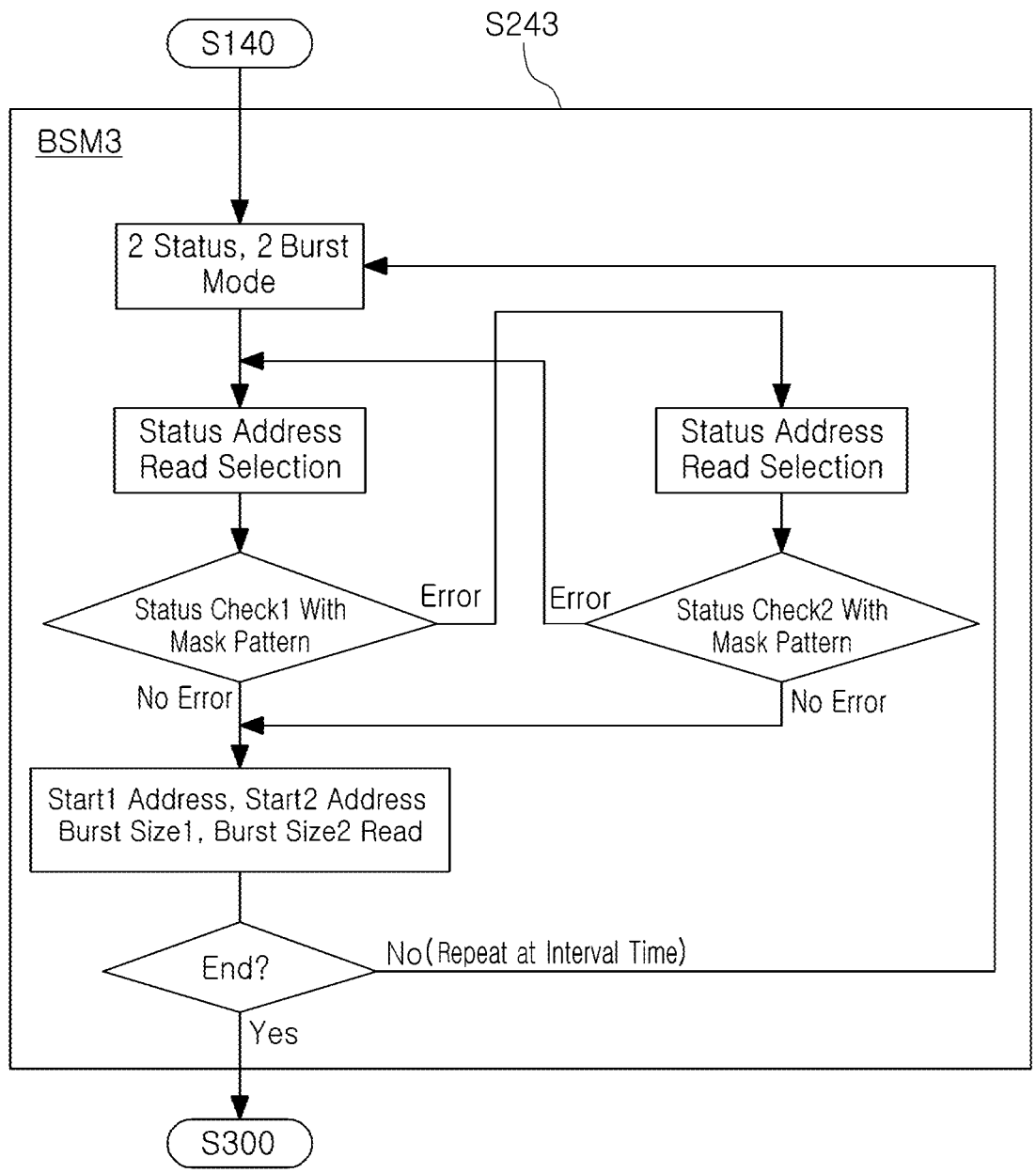
FIG. 5D is a flowchart illustrating an example of an operating flow in a third burst status mode BSM3 in FIGS. 4 and 5A.

FIG. 4 is a flowchart illustrating an example of a communication method of the camera apparatus in FIG. 1. FIG. 5A is a flowchart illustrating a more detailed example of the communication method in FIG. 4 of the camera apparatus in FIG. 1. FIG. 5B is a flowchart illustrating an example of an operating flow in a first burst status mode BSM1 in FIGS. 4 and 5A. FIG. 5C is a flowchart illustrating an example of an operating flow in a second burst status mode BSM2 in FIGS. 4 and 5A. FIG. 5D is a flowchart illustrating an example of an operating flow in a third burst status mode BSM3 in FIGS. 4 and 5A.

In the communication method of the camera apparatus, a communications operation (S1000) will now be described. First, the digital circuit 120 selects an SRI clock, calculates an SRI burst read interval, and selects a 3-wire or 4-wire mode as a preprocessing operation to start SRI communications with the sensor device 200 (S50).

Next, in a selected SRI communications mode determination operation S100, the digital circuit 120 determines an SRI communications mode selected to process corresponding data. The SRI communications mode is selected from a plurality of predefined SRI communications modes including a single mode, a plurality of burst modes without a status check, and a plurality of burst modes with a status check.

Next, the digital circuit 120 performs the selected SRI communications mode to communicate with the sensor device 200 to process corresponding data, and when the selected SRI communications mode is one of the plurality of burst modes with a status check, the digital circuit 120 checks two or more status bits to read corresponding data when there is no error in the corresponding data (S200).

The digital circuit 120 stores the corresponding data read from the sensor device 200 in the first memory 125 (S300).

In the selected SRI communications mode determination operation (S100), S110, S120, S130, and S140 are performed to recognize which mode, among the predefined SRI communications modes, is the selected SRI communications mode.

In S110, a determination is made as to whether the selected SRI communications mode is a single mode or a burst mode. When the selected SRI communications mode is the single mode, the flow enters the single mode SM. When the selected SRI communications mode is the burst mode, the flow proceeds to S120.

In S120, a determination is made as to whether the selected SRI communications mode enables a status check. When the selected SRI communications mode does not enable a status check, it is recognized as a burst mode without a status check, and the flow proceeds to S130. When the selected SRI communications mode enables a status check, it is recognized as a burst mode with a status check, and the flow proceeds to S140.

In S130, a determination is made as to whether the selected SRI communications mode is a first burst mode BM1 using one frame (data frame 1) without a status check, or a second burst mode BM2 using two frames (data frame 1 and data frame 2) without a status check. When the selected communications SRI mode is the first burst mode BM1, the flow enters the first burst mode BM1. When the selected SRI communications mode is the second burst mode BM2, the flow enters the second burst mode BM2.

In S140, a determination is made as to whether the selected SRI communications mode is a first burst status mode BSM1 (1 Status, 1 Burst mode) with a status check using status check frame 1 and data frame 1, or a second burst status mode BSM2 (1 Status, 2 Burst mode) with a status check using status check frame 1, data frame 1, and data frame 2, or a third burst status mode BSM3 (2 Status, 2 Burst mode) with a status check using status check frame 1, status check frame 2, data frame 1, and data frame 2. When the selected SRI communications mode is the first burst status mode BSM1, the flow enters the first burst status mode BSM1. When the selected SRI communications mode is the second burst status mode BSM2, the flow enters the second burst status mode BSM2. When the selected SRI communications mode is the third burst status mode BSM3, the flow enters the third burst status mode BSM3.

Subsequent operations after entering the various SPI communications modes will be described following a description of FIG. 6.

Figure 6:
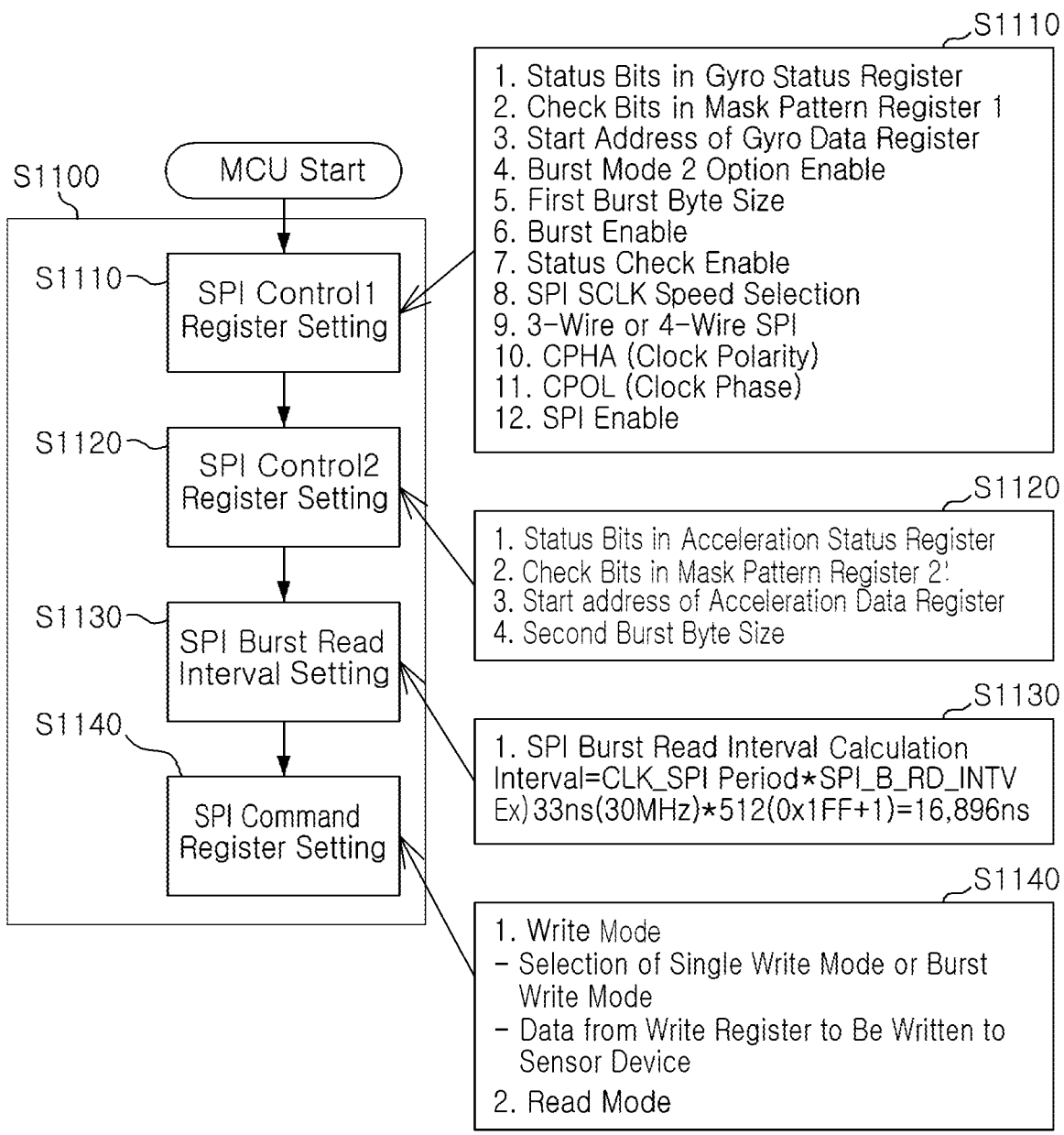
FIG. 6 is a detailed flowchart illustrating an example of an SPI communications setting flow in the camera apparatus in FIG. 1.

FIG. 6 is a flowchart illustrating an example of an SPI communications setting flow in the camera apparatus in FIG. 1.

Referring to FIG. 6, the control circuit 110 of the OIS device 100 of the camera apparatus in FIG. 1 performs a register setting operation for SPI communications in advance as set forth below to operate the SPI master 122 of the digital circuit 120 of the OIS device 100 in the selected SPI communications mode (S1100). The register setting operation S1100 in FIG. 6 is a more detailed illustration of the preprocessing operation S50 in FIGS. 4 and 5A. All of the operations in the register setting operation S1100 in FIG. 6 are performed in the preprocessing operation S50 in FIGS. 4 and 5A, although for convenience of illustration, only some of these operations are specifically shown in the preprocessing operation S50 in FIG. 5A.

As a first register setting operation, an SPI control 1 register setting is performed for a data frame 1 for SPI communications (S1110).

As an example, as illustrated in FIG. 6, settings for the data frame 1 for SPI communications include the following information:
1. Setting for status bits in a gyro status register—setting for selecting and using only status bits needed in a gyro status register.
2. Setting for check bits in a mask pattern register 1—setting for enabling check bits in a mask pattern register 1 to select status bits in the gyro status register for checking a status of corresponding gyro data to be processed.
3. Setting for a start address of the gyro data register.
4. Burst mode 2 option enable setting—setting for selecting one data frame or two data frames when an SPI frame is generated.
5. First burst byte size setting—setting of a first burst frame data size.
6. Burst enable setting—setting for selecting a single mode or a burst mode.
7. Status check enable setting—setting of whether or not to enable a status check frame, and for selecting one status check frame or two status check frames when a status check frame is enabled, when an SPI frame is generated.
8. SPI clock (SCLK) speed selection setting.
9. 3-wire or 4-wire SPI setting—setting of the number of communications lines to be used in SPI communications.
10. Clock polarity (CPHA) setting.
11. Clock phase (CPOL) setting.
12. SPI enable.

Among the above settings, "10. Clock polarity (CPHA) setting" and "11: Clock phase (CPOL) setting" are settings for determining an edge of a clock signal at which the SPI master 122 reads or writes data, and together with the above setting "8. SPI clock (SCLK) speed selection setting," correspond to the "SPI Clock Selection" setting in the preprocessing operation S50 in FIG. 5A. Also, the above setting "9. 3-wire or 4-wire SPI setting" corresponds to the "3-Wire or 4-Wire Mode Selection" setting in the preprocessing operation S50 in FIG. 5A.

Next, as a second register setting operation, an SPI control 2 register setting for a data frame 2 is performed (S1120).

As an example, as illustrated in FIG. 6, settings for the data frame 2 for SPI communications include the following information:
1. Setting for status bits in an acceleration status register—setting for selecting and using only status bits needed in an acceleration status register.
2. Setting for check bits in a mask pattern register 2—setting for enabling check bits in a mask pattern register 2 to select status bits in the acceleration status register for checking a status of corresponding acceleration data to be processed.
3. Setting for a start address of the acceleration data register.
4. Second burst byte size setting—setting of a second burst frame data size.

Next, as a third register setting operation, an SPI burst read interval setting for a burst mode of SPI communications is performed (S1130). The SPI burst read interval setting S1130 corresponds to the SPI burst read interval calculation in the preprocessing operation S50 in FIG. 5A.

For example, as shown in FIG. 6, an SPI burst read interval calculated by calculating the product (CLK_SPI period*SPI_B_RD_INTV) of a SPI clock period CLK_SPI period and SPI burst read interval data SPI_B_RD_INTV. For example, when the SPI clock period is 33 ns (corresponding to a clock frequency of 30 MHz) and the burst read interval data SPI_B_RD_INTV is 512 (0×1FF+1), the SPI burst read interval is 16,896 ns (33 ns*512).

Next, as a fourth register setting operation, an SPI command register setting is performed (S1140).

For example, as illustrated in FIG. 6, settings for the SPI command register include the following information:
1. Write mode setting.
   Selection of a single write mode or a burst write mode.
   Data from a write register to be written to the source device.
2. Read mode setting.

Through the above-mentioned operations of the register setting operation S1100, the control circuit 110 of the OIS circuit 100 defines registers for SPI communications, presets the data register in the register map 225A of the sensor device 200, and, if the selected SPI communications mode is one of the burst status modes, presets the status register in the register map 225A of the sensor device 200. Through the register setting operation S1100, a preparation is made to read corresponding data from the data register in the register map 225A of the sensor device 200.

FIG. 6 illustrates an example in which the sensor device includes a gyro sensor and an acceleration sensor, but the sensor device is not limited thereto. Furthermore, the detailed information of each setting illustrated in FIG. 6 is not limited thereto, but is merely an example.

Figure 7:
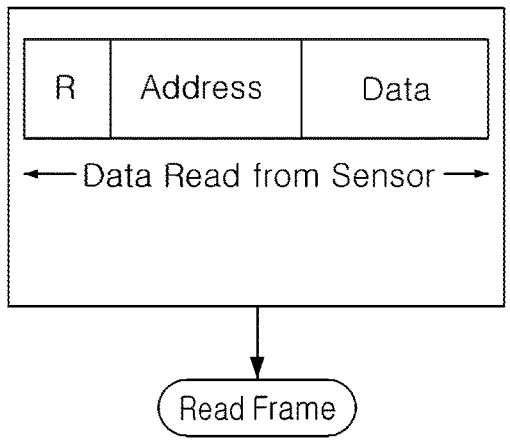
FIG. 7 is a block diagram of an example of a read frame in a single mode.
Figure 8A:
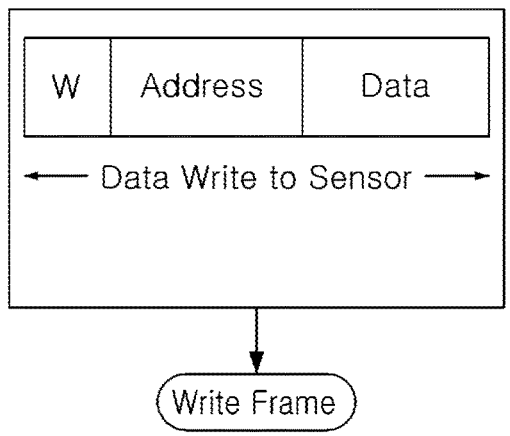
FIG. 8A is a block diagram of an example of a write frame in a single mode.
Figure 8B:
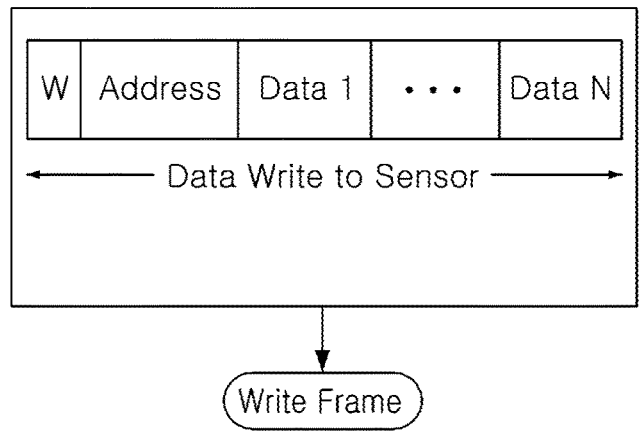
FIG. 8B is a block diagram of an example of a write frame in a burst mode.

FIG. 7 is a block diagram of an example of a read frame in a single mode, FIG. 8A is a block diagram of an example of a write frame in a single mode, and FIG. 8B is a block diagram of an example of a write frame in a burst mode.

Referring to FIG. 7, a read frame of the single read mode includes a read identification region R, an address region Address, and one data region Data.

Referring to FIG. 8A, a write frame of the single write mode includes a write identification region W, an address region Address, and one data region Data.

Referring to FIG. 8B, a write frame of the burst write mode includes a write identification region W, an address region Address, and burst data regions Data 1 to Data N.

Figure 9:
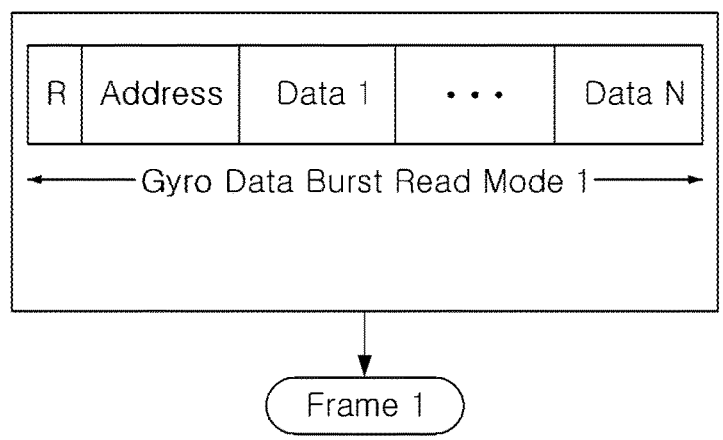
FIG. 9 is a block diagram of an example of a frame in a first burst mode.
Figure 10:
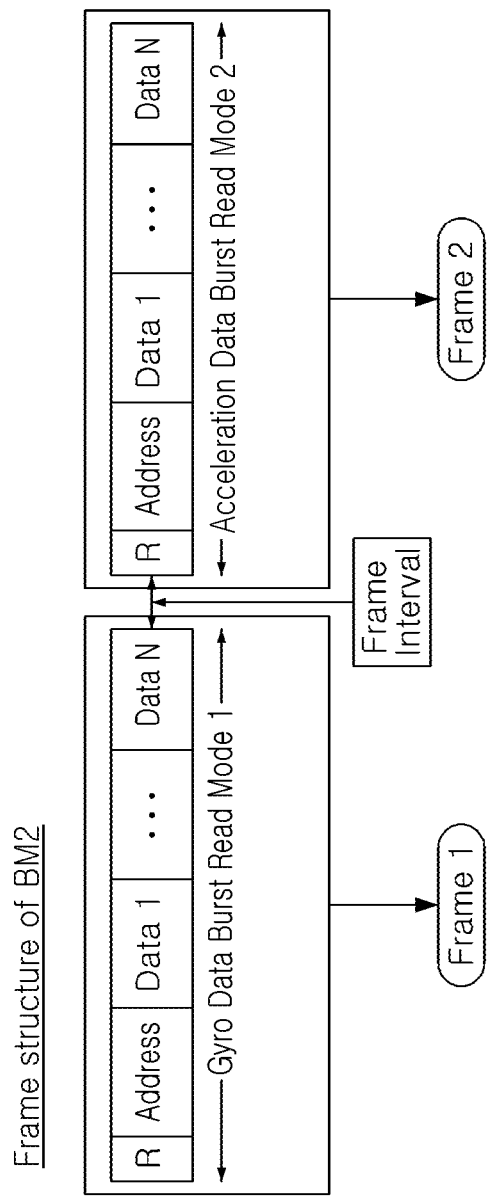
FIG. 10 is a block diagram of an example of frames in a second burst mode.

FIG. 9 is a block diagram of an example of a frame in a first burst mode, and FIG. 10 is a block diagram of an example of frames in a second burst mode.

Referring to FIGS. 9 and 10, a burst mode without a status check may be a first burst mode BM1 using one frame, or a second burst mode BM2 using two frames. For example, a frame or frames of each mode may be set as illustrated in FIGS. 9 and 10.

Referring to FIG. 9, a frame Frame 1 of the first burst mode BM1 includes a read identification region R, an address region Address, and burst data regions Data 1 to Data N. As an example, Frame 1 is a frame for reading gyro data. As another example, Frame 1 is a frame for reading acceleration data.

Referring to FIG. 10, frames of the second burst mode BM2 include two burst data frames Frame 1 and Frame 2. Each of the burst data frames Frame 1 and Frame 2 includes a read identification region R, an address region Address, and burst data regions Data 1 to Data N. As an example, Frame 1 is a frame for reading gyro data, and Frame 2 is a frame for reading acceleration data.

Figure 11:
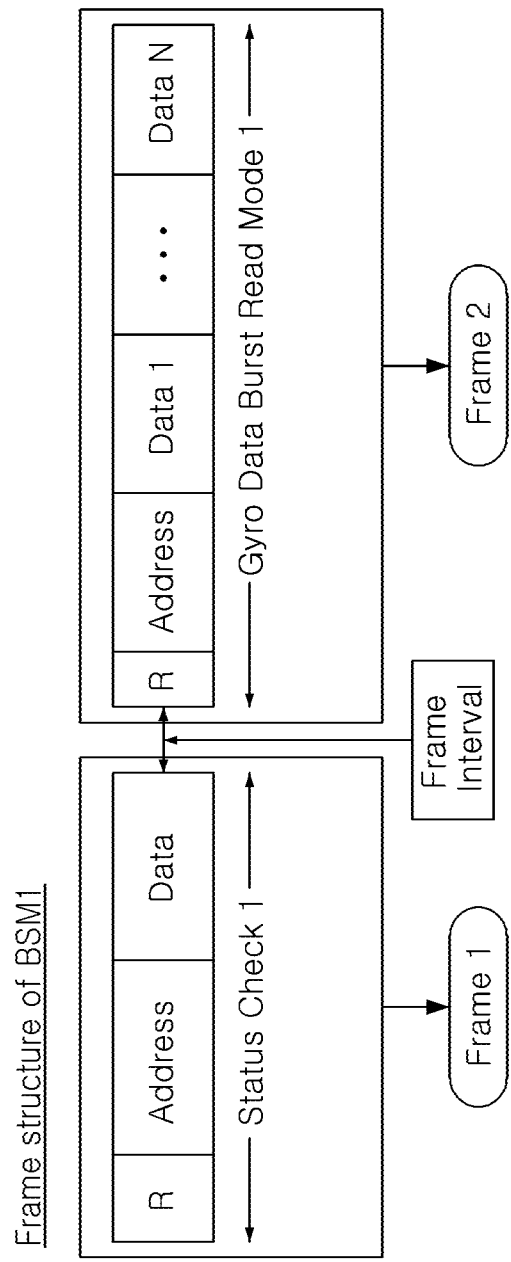
FIG. 11 is a block diagram of an example of frames in a first burst status mode
Figure 12:
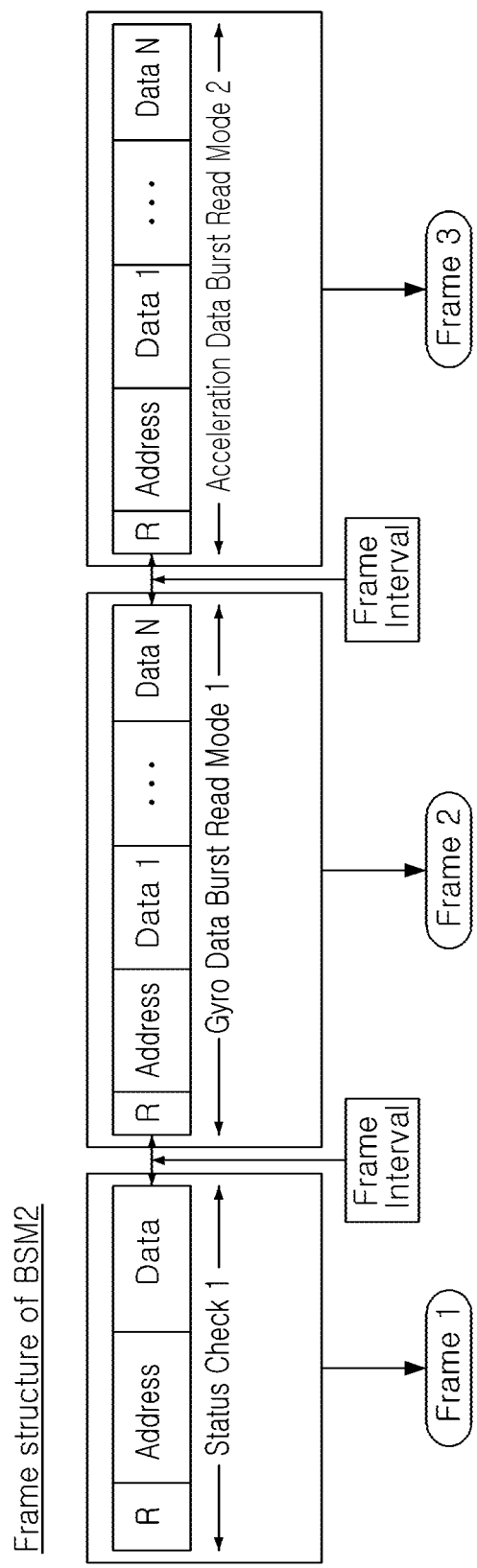
FIG. 12 is a block diagram of an example of frames in a second burst status mode.
Figure 13:
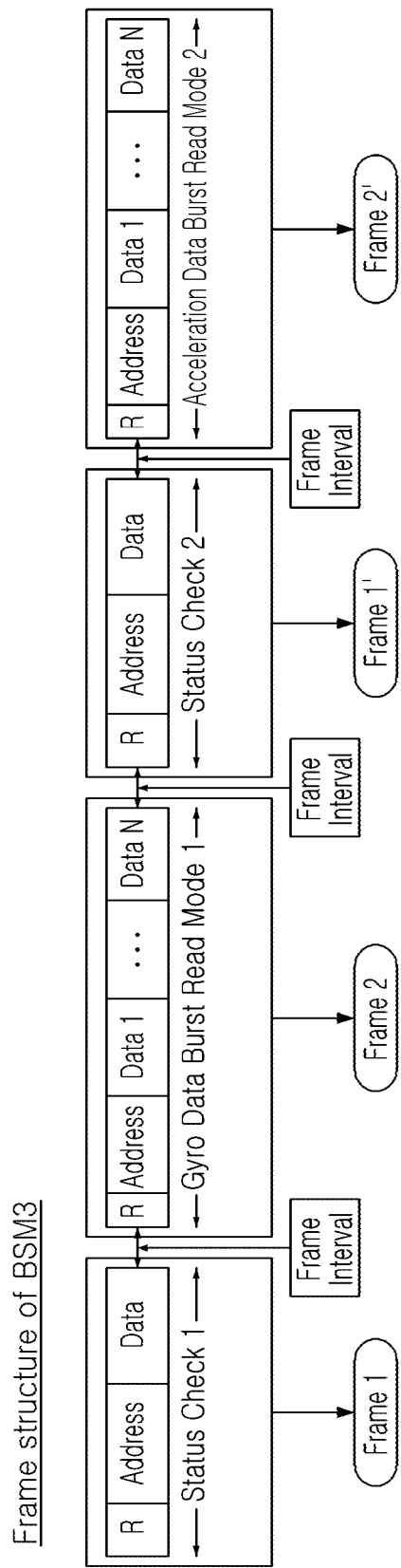
FIG. 13 is a block diagram of an example of frames in a third burst status mode.

FIG. 11 is a block diagram of an example of frames in a first burst status mode, FIG. 12 is a block diagram of an example of frames in a second burst status mode, and FIG. 13 is a block diagram of an example of frames in a third burst status mode.

Referring to FIG. 11, frames of a first burst status mode BSM1 include one status check frame Frame 1 and one burst data frame Frame 2. The status check frame Frame 1 includes a read identification region R, an address region Address, and a data region Data. The burst data frame Frame 2 includes a read identification region R, an address region Address, and a plurality of data regions Data 1 to Data N. As an example, Frame 1 is a frame for reading gyro data. As another example, Frame 1 is a frame for reading acceleration data.

Referring to FIG. 12, frames of a second burst status mode BSM2 include one status check frame Frame 1 and two burst data frames Frame 2 and Frame 3. The status check frame Frame 1 includes a read identification region R, an address region Address, and a data region Data. Each of the burst data frames Frame 2 and Frame 3 includes a read identification region R, an address region Address, and a plurality of data regions Data 1 to Data N. As an example, Frame 2 is a frame for reading gyro data, and Frame 3 is a frame for reading acceleration data.

Referring to FIG. 13, frames of a third burst status mode BSM3 include two status check frames Frame 1 and Frame 1', and two burst data frames Frame 2 and Frame 2'. For example, frames of the third burst status mode BSM3 include a first status check frame Frame 1, a first burst data frame Frame 2, a second status check frame Frame 1', and a second burst data frame Frame 2', thereby including a status check frame for each burst data frame. Each of the status check frames Frame 1 and Frame 1' includes a read identification region R, an address region Address, and a data region Data. Each of the burst data frames Frame 2 and Frame 2' includes a read identification region R, an address region Address, and a plurality of data regions Data 1 to Data N. As an example, Frame 2 is a frame for reading gyro data, and Frame 2' is a frame for reading acceleration data.

Referring to FIGS. 4 to 13, in the operation of processing corresponding data (S200), an operation procedure in each SPI communications mode will be described below.

Referring to FIGS. 4, 5A, 7, 8A, and 8B, in the single mode SM, the digital circuit 120 processes corresponding data of the sensor device 200 using one data frame (see FIGS. 7, 8A, and 8B) (S210).

As an example, in the single mode SM, the digital circuit 120 performs frame generation using a preset start address (Start Address) and a preset write/read selection to generate a read frame to read one byte of corresponding data (see FIG. 7) from a data register in the register map (225A of FIG. 3) of the sensor device 200, or to generate a write frame to write one byte of corresponding data (see FIG. 8A) or N bytes of corresponding data (see FIG. 8B) in the data register in the register map (225A of FIG. 3) of the sensor device 200 (S210).

Referring to FIGS. 4, 5A, and 9, in the first burst mode BM1, the digital circuit 120 processes corresponding data of the sensor device 200 using one burst data frame without a status check (see FIG. 9) (S231).

As an example, in the first burst mode BM1, the digital circuit 120 reads corresponding data from a gyro data register or an acceleration data register in the register map 225A of the sensor device 200 using a preset start address 1 (Start1 Address) and a preset burst size 1 (Burst Size1) without performing a status check. Such an operation of reading corresponding data in the first burst mode BM1 is repeatedly performed at a preset interval time.

Referring to FIGS. 4, 5A, and 10, in the second burst mode BM2, the digital circuit 120 processes corresponding data of the sensor device 200 using two burst data frames without a status check (see FIG. 10) (S232).

As an example, in the second burst mode BM2, the digital circuit 120 reads corresponding data from a gyro data register in the register map 225A of the sensor device 200 using a preset start address 1 (Start1 Address) and a preset burst size 1 (Burst Size1) without performing a status check, and reads corresponding data from an acceleration data register in the register map 225A of the sensor device 200 using a preset start address 2 (Start2 Address) and a preset burst size 2 (Burst Size2) without performing a status check. Such an operation of reading corresponding data in the second burst mode BM2 is repeatedly performed at a preset interval time.

Referring to FIGS. 4, 5B, and 11, in the first burst status mode BSM1, the digital circuit 120 processes corresponding data of the sensor device 200 using one status check frame (Frame 1) and one burst data frame (Frame 2) (see FIG. 11) (S241).

As an example, in the first burst status mode BSM1, the digital circuit 120 performs a status check on two or more status bits in a gyro status register or an acceleration data register in the register map 225A of the sensor device 200 according to two or more corresponding check bits enabled in the mask pattern register 125A of the digital circuit 120, and reads corresponding data from a gyro data register or an acceleration data register in the register map 225A of the sensor device 200 using a preset start address 1 (Start1 Address) and a preset burst size 1 (Burst Size1) if no error occurs during the status check performed on the gyro status register or the acceleration data register. The digital circuit 120 does not read the corresponding data if an error occurs during the status check performed on the gyro status register or the acceleration data register. Such an operation of reading corresponding data in the first burst status mode BSM1 is repeatedly performed at a preset interval time.

Referring to FIGS. 4, 5C, and 12, in the second burst status mode BSM2, the digital circuit 120 processes corresponding data of the sensor device 200 using a status check frame (Frame 1), a burst data frame 1 (Frame 2), and a burst data frame 2 (Frame 3) (see FIG. 12) (S242).

As an example, in the second burst status mode BSM2, the digital circuit 120 performs a status check on two or more status bits in a gyro status register in the register map 225A of the sensor device 200 according to two or more corresponding check bits enabled in the mask pattern register 125A of the digital circuit 120, and reads corresponding data 1 from a gyro data register in the register map 225A of the sensor device 200 using a preset start address 1 (Start1 Address) and a preset burst size 1 (Burst Size1) if no error occurs during the status check performed on the gyro status register, and reads corresponding data 2 from an acceleration data register in the register map 225A of the sensor device 200 using a preset start address 2 (Start2 Address) and a preset burst size 2 (Burst Size2) if no error occurs during the status check performed on the gyro data register. The digital circuit 120 does not read the corresponding data 1 and the corresponding data 2 if an error occurs during the status check performed on the gyro data register. Such an operation of reading corresponding data 1 and corresponding data 2 in the second burst status mode BSM2 is repeatedly performed at a preset interval time.

In the third burst status mode BSM3, the digital circuit 120 processes corresponding data of the sensor device 200 using a status check frame 1 (Frame 1), a burst data frame 1 (Frame 2), a status check frame 2 (Frame 1'), and a burst data frame 2 (Frame 2') (see FIG. 13) (S243).

As an example, in the third burst status mode BSM3, the digital circuit 120 performs a status check 1 on two or more status bits in a gyro status register in the register map 225A of the sensor device 200 according to two or more corresponding check bits enabled in the mask pattern register 125A of the digital circuit 120, and reads corresponding data 1 from a gyro data register in the register map 225A of the sensor device 200 using a preset start address 1 (Start1 Address) and a preset burst size 1 (Burst Size1) if no error occurs during the status check 1 performed on the gyro status register. The digital circuit 120 does not read the corresponding data 1 from the gyro data register if an error occurs during the status check 1 performed on the gyro status register.

Then, the digital circuit 120 performs a status check 2 on two or more status bits in an acceleration status register in the register map 225A of the sensor device 200 according to two or more corresponding check bits enabled in the mask pattern register 125A of the digital circuit 120, and reads corresponding data 2 from an acceleration data register in the register map 225A of the sensor device 200 using a preset start address 2 (Start2 Address) and a preset burst size 2 (Burst Size2) if no error occurs during the status check 2 performed on the acceleration status register. The digital circuit 120 does not read the corresponding data 2 if an error occurs during the status check 2 performed on the acceleration status register.

Such an operation of reading corresponding data 1 and corresponding data 2 in the third burst status mode BSM3 is repeatedly performed at a preset interval time.

Although not illustrated in FIGS. 5A to 5D, each of the operations S231, S232, S241, S242, and S243 includes a frame generation operation that generates the various frames used in the respective one of the BM1, BM2, BSM1, BSM2, and BSM3 modes, like the frame generation operation in the operation S210 that generates the frame used in the SM mode.

Figure 14:
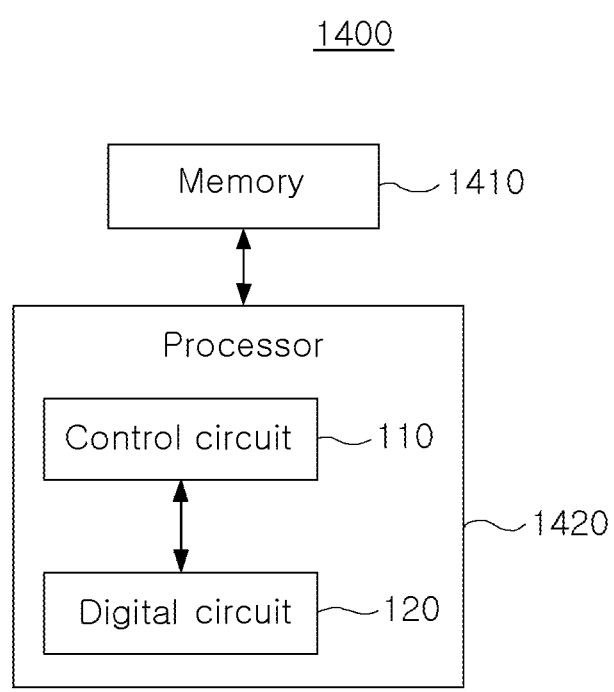
FIG. 14 is a block diagram illustrating an example of a controller implementing the control circuit and the digital circuit in FIGS. 1 to 3.

FIG. 14 is a block diagram illustrating an example of a controller implementing the control circuit and the digital circuit in FIGS. 1 to 3.

Referring to FIG. 14, a controller 1400 includes a memory 1410 and a processor 1420. The memory 1410 stores instructions that, when executed by the processor 1420, cause the processor 1420 to perform the functions of the control circuit 110 and the digital circuit 120 in FIGS. 1 to 3 described above in connection with FIGS. 1 to 13. Thus, the processor 1420 includes the control circuit 110 and the digital circuit 120.

In the examples described above, by adding a status check frame before each data frame for corresponding data to be read, two or more status bits are checked for each corresponding data to be read. Thus, the accuracy of reading the corresponding data is enhanced.

In the examples described above, each of the control circuit 110 and the digital circuit 120 of the camera apparatus may be implemented in a computing environment including a processor (for example, any one or any combination of any two or more of a central processing unit (CPU), a graphics processing unit (GPU), a microprocessor, an application-specific integrated circuit (ASIC), or a field-programmable gate array (FPGA), a memory (for example, either one or both of a volatile memory (for example, a random-access memory (RAM) and a non-volatile memory (for example, either one or both of a read-only memory (ROM) and a flash memory), an input device (for example, any one or any combination of any two or more of a keyboard, a mouse, a pen, a voice input device, a touch input device, an infrared ray camera, and a video input device), an output device (for example, any one or any combination of any two or more of a display, a speaker, and a printer), and a communication interface unit (for example, any one or any combination of any two or more of a modem, a network interface card (NIC), an integrated network interface, a wireless transmitter/receiver, an infrared port, and a universal serial bus (USB) interface unit) are connected to each other (for example, via any one or any combination of any two or more of a peripheral component interface (PCI), a USB connection, a FireWire (IEEE 1394) connection, an optical bus, and a network).

The computing environment may be a personal computer, a server computer, a handheld device, a laptop device, a mobile device (a mobile phone, a personal digital assistant (PDA), and a media player), a multiprocessor system, a consumer electronic device, a minicomputer, or a main frame computer, but is not limited thereto, or may be a distributed computing environment.

According to the examples described above, an SPI communications efficiency is enhanced by changing an SPI frame structure errors in processing data. For example, by using a novel frame structure to control an SPI master, an accuracy of a status check is enhanced and the time needed to read data from a sensor device reduced.

Accordingly, a number of MCU accesses is reduced, and a process of reading data from a sensor device is simplified. As a result, a waste of time resources is reduced and a data processing speed is increased to implement an OIS device that is able to operate more stably.

The control circuit 110, the digital circuit 120, the SRI master 122, and the SRI slave 222 in FIGS. 1 to 3 and the first memory 125, the mask pattern register 125A, the second memory 225, and the register map 225A in FIGS. 2 and 3 that perform the operations described in this application are implemented by hardware components configured to perform the operations described in this application that are performed by the hardware components. Alternatively, the SRI master 122 and the SRI slave 222 in FIGS. 1 to 3 may be implemented by dedicated hardware components. Examples of hardware components that may be used to perform the operations described in this application where appropriate include controllers, sensors, generators, drivers, memories, comparators, arithmetic logic units, adders, subtractors, multipliers, dividers, integrators, transistors, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with reference to FIGS. 1 to 14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera apparatus comprising:
    an optical image stabilizer (OIS) device comprising:
        a control circuit configured to control data processing comprising reading data and writing data; and
        a digital circuit comprising a serial peripheral interface bus (SPI) master and configured to perform data processing based on SPI communications performed using the SPI master in response to the control of the control circuit to perform an OIS function; and
    a sensor device comprising an SPI slave configured to communicate with the SPI master and respond to a request from the OIS device,
    wherein the control circuit is further configured to set a selected SPI communications mode selected from a plurality of predefined SPI communications modes comprising a single mode, a plurality of burst modes without a status check, and a plurality of burst status modes with a status check, and control communications between the digital circuit and the sensor device using the selected SPI communications mode, and
    the digital circuit is further configured to perform the selected SPI communications mode in response to the control of the control circuit, and in response to the selected SPI communications mode being one of the plurality of burst status modes with a status check, check two or more status bits for corresponding data to be read from the sensor device before reading the corresponding data from the sensor device.

2. The camera apparatus of claim 1, wherein one of the plurality of burst modes with a status check is a specific communications mode in which a status is checked for each corresponding data to be read, and the digital circuit is further configured to check a status for each corresponding data to be read from the sensor device and read the corresponding data from the sensor device using a preset status check frame and a preset data frame in response to the selected SPI communications mode being the specific communications mode.

3. The camera apparatus of claim 1, wherein the digital circuit comprises a first memory comprising a mask pattern register having two or more check bits enabled, the two or more check bits corresponding to the two or more status bits,
    the sensor device comprises a second memory configured to store the corresponding data, and
    the digital circuit is further configured to read the corresponding data from the second memory.

4. The camera apparatus of claim 3, wherein the digital circuit is further configured to check the two or more status bits for the corresponding data to be read from the sensor device using the two or more check bits enabled in the mask pattern register to determine whether the corresponding data to be read from the sensor device is updated valid data, and read the corresponding data from the second memory in response to the corresponding data being determined to be updated valid data.

5. The camera apparatus of claim 1, wherein the digital circuit is further configured to:
    perform the single mode using one data frame in response to the selected SRI communications mode being the single mode, and
    perform a corresponding burst mode using one or two data frames in response to the selected SRI communications mode being one of a first burst mode without a status check, a second burst mode without a status check, a first burst status mode with a status check, a second burst status mode with a status check, and a third burst status mode with a status check.

6. The camera apparatus of claim 5, wherein the single mode is a mode in which the corresponding data to be read from the sensor device is processed using one data frame,
    the first burst mode is a mode in which the corresponding data to be read from the sensor device is processed using one data frame without a status check,
    the second burst mode is a mode in which the corresponding data to be read from the sensor device is processed using two data frames without a status check,
    the first burst status mode is a mode in which the corresponding data to be read from the sensor device is processed using one status check frame and one data frame,
    the second burst status mode is a mode in which the corresponding data to be read from the sensor device is processed using one status check frame and two data frames, and
    the third burst status mode is a mode in which the corresponding data to be read from the sensor device is processed using a first status check frame, a first data frame, a second status check frame, and a second data frame.

7. The camera apparatus of claim 6, wherein the digital circuit is further configured to:
    read and store the corresponding data from the sensor device using one data frame in the single mode in response to the selected SPI communications mode being the single mode, read and store the corresponding data from the sensor device using one data frame without a status check in the first burst mode in response to the selected SPI communications mode being the first burst mode, read and store the corresponding data from the sensor device using two data frames without a status check in the second burst mode in response to the selected SPI communications mode being the second burst mode, read and store the corresponding data from the sensor device using one status check frame and one data frame in the first burst status mode in response to the selected SPI communications mode being the first burst status mode, read and store the corresponding data from the sensor device using one status check frame and two data frames in the second burst status mode in response to the selected SPI communications mode being the second burst status mode, and read and store the corresponding data from the sensor device using a first status check frame, a first data frame, a second status check frame, and a second data frame in the third burst status mode in response to the selected SPI communications mode being the third burst status mode.

8. The camera apparatus of claim 7, wherein the status check frame of each of the first burst status mode and the second burst status mode and each of the status check frames of the third burst status mode comprises a read identification region, an address region, and a data region, the data frame of the single mode comprises a read identification region, an address region, and a data region for reading gyro data or acceleration data from the sensor device, and the data frame of each of the first burst mode and the first burst status mode and each of the data frames of the second burst mode, the second burst status mode, and the third burst status mode comprises a read identification region, an address region, and a plurality of data regions for reading gyro data or acceleration data from the sensor device.

9. A communication method of a camera apparatus comprising an optical image stabilizer (OIS) device, the OIS device comprising a digital circuit and a sensor device, the digital circuit comprising a serial peripheral interface bus (SPI) master and a control circuit, the sensor device comprising an SPI configured to perform SPI communication with the SPI master, the communication method comprising:

setting a selected SPI communications mode selected from a plurality of predefined SPI communications modes comprising a single mode, a plurality of burst modes without a status check, and a plurality of burst modes with a status check;

processing corresponding data from the sensor device by performing the selected SPI communications mode, the processing of the corresponding data comprising, in response to the selected SPI communications mode being one of the plurality of burst modes with a status check, checking two or more status bits for corresponding data to be read from the sensor device before reading the corresponding data from the sensor device; and storing the corresponding data read from the sensor device.

10. The communication method of claim 9, wherein one of the plurality of burst modes with a status check is a specific communications mode in which a status is checked for each corresponding data to be read, and the processing of the corresponding data further comprises checking a status for each corresponding data to be read from the sensor device and reading the corresponding data from the sensor device using a preset status check frame and a preset data frame in response to the selected SPI communications mode being the specific communications mode.

11. The communication method of claim 9, wherein the digital circuit comprises a first memory comprising a mask pattern register having two or more check bits enabled, the two or more check bits corresponding to the two or more status bits, the sensor device comprises a second memory configured to store the corresponding data, and the processing of the corresponding data further comprises reading the corresponding data from the second memory.

12. The communication method of claim 11, wherein the processing of the corresponding data further comprises:

checking the two or more status bits for the corresponding data to be read from the sensor device using the two or more check bits enabled in the mask pattern register to determine whether the corresponding data to be read from the sensor device is updated valid data, and reading the corresponding data from the second memory in response to the corresponding data being determined to be updated valid data.

13. The communication method of claim 9, wherein the processing of the corresponding data further comprises:

performing the single mode using one data frame in response to the selected SRI communications mode being the single mode, and performing a corresponding burst mode using one or two data frames in response to the selected SRI communications mode being one of a first burst mode without a status check, a second burst mode without a status check, a first burst status mode with a status check, a second burst status mode with a status check, and a third burst status mode with a status check.

14. The communication method of claim 13, wherein the single mode is a mode in which the corresponding data to be read from the sensor device is processed using one data frame, the first burst mode is a mode in which the corresponding data to be read from the sensor device is processed using one data frame without a status check, the second burst mode is a mode in which the corresponding data to be read from the sensor device is processed using two data frames without a status check, the first burst status mode is a mode in which the corresponding data to be read from the sensor device is processed using one status check frame and one data frame, the second burst status mode is a mode in which the corresponding data to be read from the sensor device is processed using one status check frame and two data frames, and the third burst status mode is a mode in which the corresponding data to be read from the sensor device is processed using a first status check frame, a first data frame, a second status check frame, and a second data frame.

15. The communication method of claim 14, wherein the processing of the corresponding data further comprises:

reading and storing the corresponding data from the sensor device using one data frame in the single mode in response to the selected SPI communications mode being the single mode, reading and storing the corresponding data from the sensor device using one data frame without a status check in the first burst mode in response to the selected SPI communications mode being the first burst mode, reading and storing the corresponding data from the sensor device using two data frames without a status check in the second burst mode in response to the selected SPI communications mode being the second burst mode, reading and storing the corresponding data from the sensor device using one status check frame and one data frame in the first burst status mode in response to the selected SPI communications mode being the first burst status mode, reading and storing the corresponding data from the sensor device using one status check frame and two data frames in the second burst status mode in response to the selected SPI communications mode being the second burst status mode, and reading and storing the corresponding data from the sensor device using a first status check frame, a first data frame, a second status check frame, and a second data frame in the third burst status mode in response to the selected SPI communications mode being the third burst status mode.

16. The communication method of claim 15, wherein the status check frame of each of the first burst status mode and the second burst status mode and each of the status check frames of the third burst status mode comprises a read identification region, an address region, and a data region, the data frame of the single mode comprises a read identification region, an address region, and a data region for reading gyro data or acceleration data from the sensor device, and the data frame of each of the first burst mode and the first burst status mode and each of the data frames of the second burst mode, the second burst status mode, and the third burst status mode comprises a read identification region, an address region, and a plurality of data regions for reading gyro data or acceleration data from the sensor device.

* * * * *